United States Patent
Tramoni

(10) Patent No.: US 11,088,726 B2
(45) Date of Patent: Aug. 10, 2021

(54) DEVICE AND METHOD FOR NFC DEVICE CHARGING

(71) Applicant: STMicroelectronics (Rousset) SAS, Rousset (FR)

(72) Inventor: Alexandre Tramoni, Le Beausset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/879,314

(22) Filed: May 20, 2020

(65) Prior Publication Data

US 2020/0382165 A1 Dec. 3, 2020

(30) Foreign Application Priority Data

Jun. 3, 2019 (FR) ...................................... 1905860

(51) Int. Cl.
*H04B 5/00* (2006.01)
(52) U.S. Cl.
CPC .................................. *H04B 5/0037* (2013.01)
(58) Field of Classification Search
CPC ...... H04B 5/00; H04B 5/0025; H04B 5/0031; H04B 5/0037; H02J 7/00712; H02J 50/20; H02J 50/60; G06K 19/0704; G06K 7/10158; G06K 7/10237
See application file for complete search history.

(56) References Cited

U.S. PATENT DOCUMENTS

| | | | |
|---|---|---|---|
| 2004/0256460 A1* | 12/2004 | Charrat | H04B 5/0075 235/451 |
| 2008/0299919 A1* | 12/2008 | Mow | H04B 1/0483 455/108 |
| 2013/0119929 A1 | 5/2013 | Partovi | |
| 2013/0127410 A1 | 5/2013 | Park et al. | |
| 2014/0139322 A1* | 5/2014 | Wang | H04B 5/0075 340/10.5 |
| 2018/0358834 A1 | 12/2018 | Partovi | |
| 2019/0132431 A1 | 5/2019 | Ziv et al. | |

* cited by examiner

*Primary Examiner* — Diana J. Cheng
(74) *Attorney, Agent, or Firm* — Slater Matsil, LLP

(57) ABSTRACT

The present disclosure relates to a detection method or device, by a first NFC device generating an electromagnetic field for recharging a battery of a second NFC device, of a disruptive condition, in which thresholds (MHTH, MLTH, PHTH, PLTH) for detection of a variation of the field are adjusted in real time during the recharging.

25 Claims, 5 Drawing Sheets

DEVICE AND METHOD FOR NFC DEVICE CHARGING

CROSS-REFERENCE TO RELATED APPLICATIONS

This application claims the priority benefit of French Patent application number 19/05860, filed on Jun. 3, 2019, the content of which is hereby incorporated herein by reference in its entirety to the maximum extent allowable by law.

TECHNICAL FIELD

The present disclosure relates generally to electronic circuits, and more specifically to electromagnetic transponders or electronic tags. The present disclosure applies more particularly to electronic devices incorporating a near field communication (NFC) circuit and the near field recharging of a device.

BACKGROUND

Electromagnetic transponder communication systems are increasingly frequent, in particular, since the development of near field communication (NFC) technologies.

These systems use a radiofrequency electromagnetic field generated by a device (terminal or reader) to communicate with another device (card).

In recent systems, a same NFC device can operate in card mode or in reader mode (for example, in the case of a near field communication between two mobile telephones). It is then frequent for the devices to be powered by batteries. The battery of an NFC device can then be rechargeable in near field, that is to say, using its near field communication antenna. This recharging is done from another NFC "charger" device working on batteries or drawing its energy from a connection to an electrical grid or a power supply device.

SUMMARY

There is a need to improve NFC recharging processes for devices by near field.

One embodiment addresses all or some of the drawbacks of known NFC devices and their near field charging system.

One embodiment provides a detection method, by a first NFC device generating an electromagnetic field for recharging a battery of a second NFC device, of a disruptive condition, in which thresholds (MHTH, MLTH, PHTH, PLTH) for detection of a variation of the field are adjusted in real time during the recharging.

One embodiment provides a circuit for detecting a condition disrupting recharging, by a first NFC device, of a battery of a second NFC device by electromagnetic field, including elements for adjusting variation detection thresholds of the field.

One embodiment provides an NFC device including a circuit for detecting a condition disrupting recharging and/or a processor for detecting a condition disrupting recharging.

One embodiment provides a computer program product including instructions for implementing the method for detecting a condition disrupting recharging.

According to one embodiment, two thresholds define a window of magnitudes of a signal across the terminals of an oscillating circuit of the first device.

According to one embodiment, two thresholds define a window of phases of a signal across the terminals of an oscillating circuit of the first device.

According to one embodiment, the thresholds are adjusted several times per second during the recharging of the battery of the second device.

According to one embodiment, the window is a sliding window as a function of an average of several measured values of the magnitude or the phase.

According to one embodiment, the average accounts for between 5 and 50, preferably between 10 and 20 values.

According to one embodiment, the first device stops the recharging if the current measured magnitude leaves the magnitude threshold window or if the current measured phase leaves the phase threshold window.

According to one embodiment, the disruptive condition is: an appearance of a foreign object in the field generated by the first device; a departure of the second device from the field generated by the first device; or a complete charge situation of the battery of the second device.

According to one embodiment, a complete charge situation is validated in case of absence of variation of the thresholds during a selected duration.

According to one embodiment, outside recharging periods, the adjustment of the thresholds is done during transmission bursts between standby phases of the first device.

According to one embodiment, the first device switches to an operating mode for transmitting a polling sequence as defined in the NFC Forum standard when a second device is detected within range.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radiofrequency signals and their interpretation have not been described in detail, the described embodiments and modes of implementation being compatible with the standard techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

For simplification, reference will sometimes be made to charging or recharging an NFC device, but this refers to charging or recharging one or several batteries included by this device. Likewise, the term "charge" and the term "recharge" will be used interchangeably to refer to supplying energy to the battery.

Figure 1:
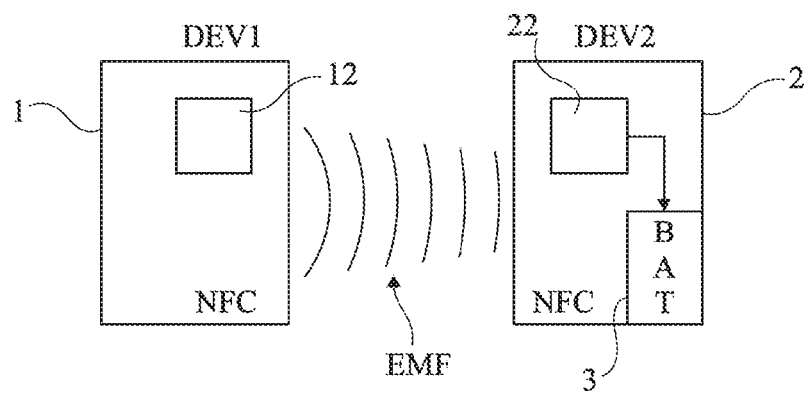
FIG. 1 is a schematic illustration in block diagram form of an exemplary near field communication system, of the type to which, as an example, the described embodiments apply.

FIG. 1 is a schematic illustration in block diagram form of an exemplary near field communication system, of the type to which, as an example, the described embodiments apply.

The case is considered of two similar electronic devices, for example two mobile telephones, but everything that will be described applies more generally to any system in which a reader, terminal or device must charge a transponder equipped with a battery by the electromagnetic field that it radiates. To simplify, reference will be made to NFC devices in order to designate electronic devices incorporating near field communication circuits.

Two NFC devices 1 (DEV1) and 2 (DEV2) are able to communicate by near field electromagnetic coupling. Depending on the applications, for a communication, one of the devices operates in so-called reader mode, while the other operates in so-called card mode, or both devices communicate in peer-to-peer (P2P) mode. Each device includes various electronic circuits 12 and 22 for generating and/or detecting a radiofrequency signal using an antenna (not shown). The radiofrequency field generated by one of the devices is detected by the other device, which is within range.

When a device (for example, the device 1) transmits an electromagnetic field in order to initiate a communication with another NFC device (for example, the device 2), this field is detected by this device 2 once it is within range. The coupling between the two oscillating circuits (that of the antenna of the device 2 and that of the device 1) is reflected by a variation of the charge made up of the circuits of the device 2 on the oscillating circuit for generating the field of the device 1. In practice, for a communication, the corresponding phase or magnitude variation of the transmitted field is detected by the device 1, which then begins an NFC communication protocol with the device 2. On the device 1 side, in practice it is detected whether the magnitude of the voltage across the terminals of the oscillating circuit and/or the phase shift relative to the signal generated by the circuit 1 depart from the magnitude and phase windows each defined by a lower threshold and an upper threshold.

In the case of a communication, once the device 1 has detected the presence of the device 2 in its field, it begins a procedure for establishing communication, implementing transmissions of the requests by the device 1 and responses by the device 2 (polling sequence as defined in the NFC Forum standard). If circuits of the device 2 are in standby mode, they are then reactivated.

When one of the NFC devices, for example the device 1, is used to charge a battery 3 (BAT) of the other device 2, the electromagnetic field EMF generated by the device 1 is captured by the circuits 22 of the device 2 and the energy that is extracted therefrom is used to charge the battery 3.

For energy saving reasons, the transmitting device 1, whether it is connected to the electrical distribution sector or itself supplied directly or indirectly by battery, is placed in standby mode when it is not in use for charging or for communication. As a result, it must detect the presence of a device 2 to be charged in order to begin generating the energy supply field.

NFC devices are generally equipped with circuits for detecting another device located within their field in order to exit standby mode for communication purposes.

In the applications more particularly targeted by the present description, when an NFC device is not in the process of communicating, it is switched to so-called low power mode in order to reduce the consumed energy. This is in particular the case for battery-powered devices. In this low power mode, a device configured in reading mode executes a so-called tag detection or card detection mode and executes detection loops. The detection is similar to that done when the device is not in low power mode, but the difference is that, in normal mode, the transmission of the carrier is continuous and periodically includes polling frames whereas, in order to reduce consumption, the transmission of the field is done by periodic bursts and without polling frame when the device is in low power mode. The bursts have a significantly shorter duration (in a ratio of at least ten, preferably at least one hundred) than the duration of a polling request of a card in normal mode.

Figure 2:
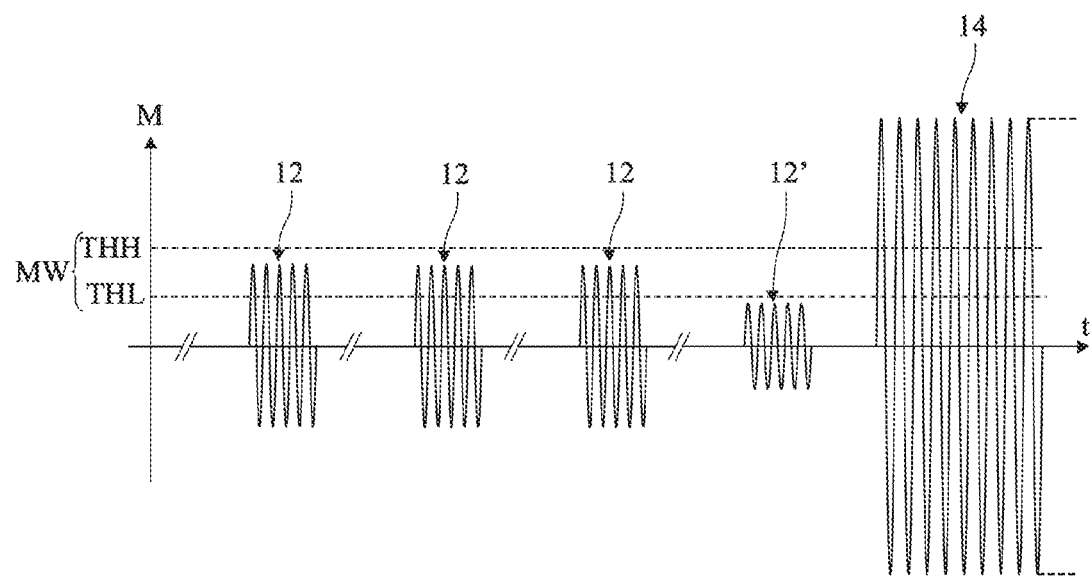
FIG. 2 illustrates, through a timing diagram, an exemplary process for the detection, by a device in read mode in standby, of a device in card mode.

FIG. 2 illustrates, through a timing diagram, an exemplary process for the detection, by a device in read mode in standby, of a device in card mode.

FIG. 2 schematically illustrates an exemplary curve of the magnitude M of the signal across the terminals of the oscillating circuit of the device operating in reader mode.

When it is in low power mode, an NFC device (for example, the charger device 1) seeking to detect the presence of other devices within range periodically transmits a field burst 12. This detection burst generally only includes the carrier, typically at 13.56 MHz, without modulation, and has a relatively short duration relative to the interval between two bursts, preferably in a ratio of at least 100. The interval between two bursts depends on the devices, but is generally several hundred milliseconds (typically 256 ms), while the duration of a burst 12 is in the order of about ten or one hundred microseconds. When a device is located in the field and modifies the charge of the oscillating circuit of the transmitting device, this results in a magnitude and/or phase variation of the signal across the terminals of the oscillating circuit during a corresponding burst 12'. If this variation is sufficient to exit a magnitude window MW, defined by a lower threshold THL and an upper threshold THH, the transmitting device switches to active mode, that is to say, it leaves the low power mode, and then transmits normally (transmission 14).

If applicable, the device 1 leaves standby mode temporarily and periodically to transmit the bursts 12. However, it is preferred to use a finite-state machine to transmit bursts in low power mode, which avoids having to wake up a microcontroller of the device and thus makes it possible to stay in standby mode.

In practice, a device in card mode is considered to be detected for communication or recharging purposes, during a detection burst 12, if the magnitude and/or the phase exits windows each defined by two thresholds respectively representing a range of magnitudes and a range of phases inside which it is considered to be empty (with no card present). In the example of FIG. 2, it is presumed that the presence of a card is reflected by a drop in magnitude (burst 12'). However, the presence of a card can, depending on the conditions, also be reflected by an increase in magnitude. The same is true for the phase shift relative to the transmitted signal.

When a card is detected and the transmitting device is activated, it begins to transmit the field with polling frames 14 of a communication. These frames are standardized (NFC Forum standard) and depend on the communication protocols supported by the reader. The receiver device (in card mode) responds to the request according to the protocol that it supports and the started communication. The transmission duration of a frame is generally in the order of several milliseconds to several tens of milliseconds.

In the case of recharging of the device 2 by the device 1, a communication like above generally precedes the recharging of the battery so that the device 2 to be recharged switches its internal circuits appropriately for the energy extracted from the electromagnetic field to charge its battery.

When the recharging is completed or when the receiving device to be charged leaves the field, the transmitting device must return to low power mode after a certain length of time (in the order of a second) in order to reduce its consumption. It then again begins to emit periodic detection bursts with no communication request.

While the charging device is generating a field to recharge another device, it would be ideal for this charging device to be capable of detecting certain conditions, called disruptive conditions, justifying stopping the charging.

A first condition, which it would be ideal for the charging device 1 to be capable of detecting, is the presence of a disrupting object, called foreign object (FOD—Foreign Object Detection), while it performs the recharging of the device 2.

Figure 3:
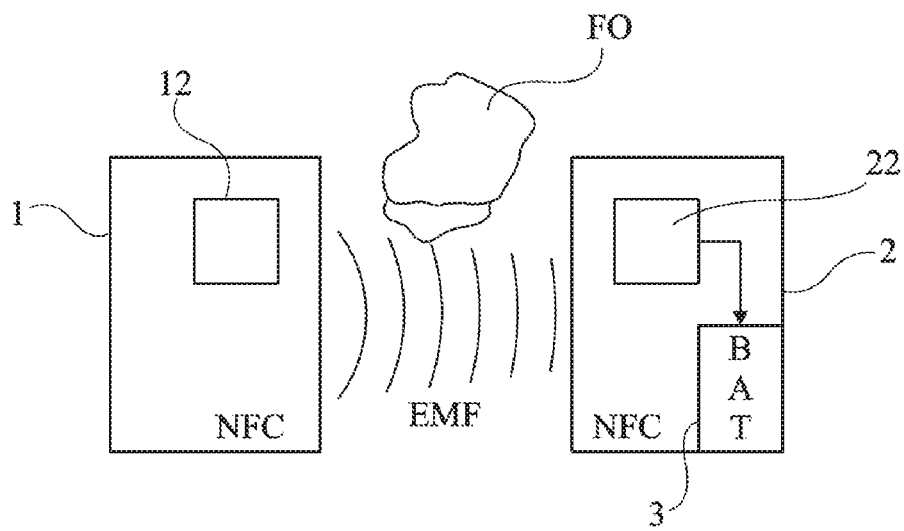
FIG. 3 illustrates, in block form and schematically, the presence of a foreign object in an electromagnetic recharging field of an NFC device.

FIG. 3 illustrates, in block form and schematically, the presence of a foreign object in an electromagnetic recharging field of an NFC device.

The elements of the system shown in FIG. 1 are seen again here, and it is presumed that the device 1 generates an electromagnetic field for recharging the battery 3 of the device 2.

FIG. 3 illustrates the presence of a foreign object or body FO in the electromagnetic field EMF generated by the device 1. "In the field" refers to an object close enough to the device 1 to disrupt the field EMF, that is to say, to generate a significant variation of the magnitude and/or the phase, of the voltage across the terminals of the oscillating circuit of the device 1.

A second condition, which it would be ideal for the charging device 1 to be capable of detecting, is a departure by the device 2 from the electromagnetic field, that is to say, a situation in which it is no longer within sufficient range of the device 1 to capture energy sufficiently to charge its battery.

A third condition, which it would be ideal for the charging device 1 to be capable of detecting, is the end of charging of the battery of the device 2. In some cases, this end of charging is signaled by a communication between the charged device and the charging device. In other cases, this communication does not occur.

According to the described embodiments, in the presence of one of these conditions, the device stops the charging, that is to say, cuts the transmission of the electromagnetic field. It then preferably returns to standby mode. Although this operation can be likened to a normal operating mode, it is considered that it involves a disruptive condition in that it justifies stopping the recharging.

The detection of one of these disruptive conditions (foreign object, departure from field by the device being charged, end of charging) requires that the transmitting device analyze the charge variations of its oscillating circuit in order to be capable of performing the detection.

The described embodiments originate from a new analysis of the effects of the conditions that one wishes to detect on the magnetic field produced by the charging devices.

The conditions that one wishes to detect are apparently contradictory. Indeed, the appearance of a foreign object represents an additional object in the field and the departure of the device being charged represents one less object in the field.

One can in fact see that by using the circuits for detecting the presence of a card in the field of a reader that exploits a detection window, one can consider that, irrespective of the condition that disrupts the field, the latter causes the signal to leave the considered window. As a result, it is possible to consider that once the device 2 is charged, if the information representative of the magnitude and/or the information representative of the phase leaves the detection window, one of the conditions to be detected has been met.

According to the described embodiments, it is provided to compare the magnitude and/or phase variations of the signal across the terminals of the oscillating circuit of the device 1 relative to thresholds in order to consider that one of the conditions for stopping the recharging is met when one of these thresholds is exceeded (in the direction of an increase or a decrease).

A difficulty then lies in the fact that the detection, by the transmitting device, of a variation of the magnitude of the field or of its phase can be disrupted by different environmental factors other than the conditions that one wishes to detect (temperature variation, etc.). This can lead either to false detections of one of the conditions, or to absences of detection of one of the conditions that one wishes to detect.

Furthermore, the recharging of the battery of the device 2 to be charged in turn creates a variation of the magnitude and the phase of the signal transmitted by the device 1. In particular, as the battery recharges, the magnitude of the current drawn from the field decreases.

Figure 4:
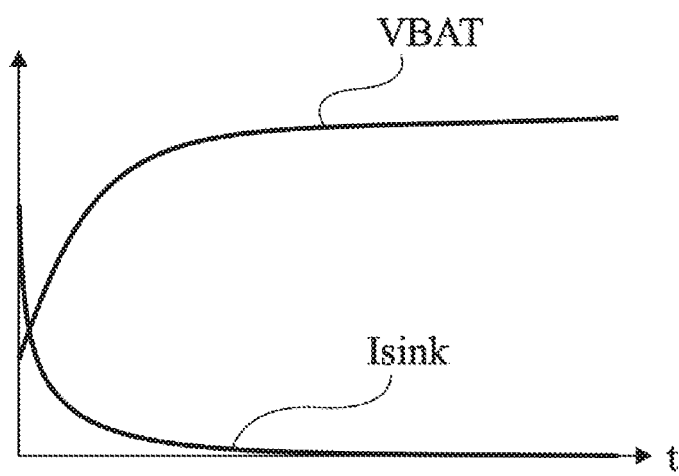
FIG. 4 illustrates, in the form of a timing diagram, an exemplary variation of the current pulled from the electromagnetic field of the charger as a function of the charge level of the battery to be charged.

FIG. 4 illustrates, in the form of a timing diagram, an exemplary variation of the current pulled from the electromagnetic field of the charger as a function of the charge level of the battery to be charged.

The curve VBAT illustrates the evolution over time of the voltage across the terminals of the battery during charging.

The curve Isink illustrates the corresponding evolution of the current withdrawn from the electromagnetic field.

These variations reflect the equivalent charge of the oscillating circuit of the charging device and therefore cause the magnitude and the phase of the signal to vary across the terminals of this oscillating circuit.

According to the described embodiments, it is provided to vary the presence detection window of an NFC device (the window MW in FIG. 2), whether for the magnitude or for the phase, so as to adjust the detection thresholds to the normal detection conditions. Thus, when the signal leaves this window, in one direction or the other, this means that one of the first two conditions (presence of a foreign object or departure from the field by the device being charged) is met.

According to one preferred embodiment, presence detection circuits are used of the type used for a departure from standby mode. Indeed, as long as one adapts the detection thresholds in real time as will be seen hereinafter, the nature of the desired detection to detect a condition justifying stopping the recharging is similar to a detection of the presence or absence of a transponder in the field.

Figure 5:
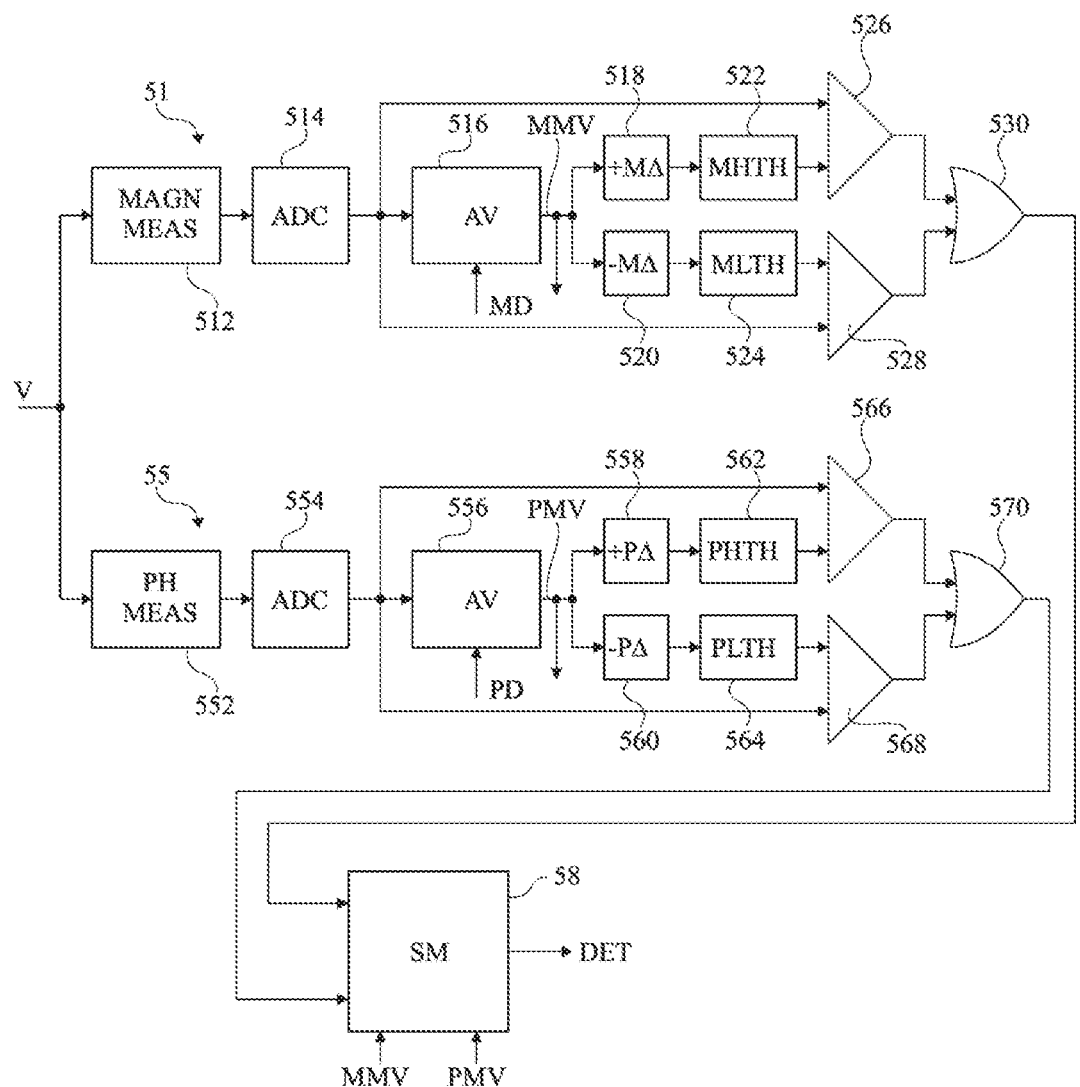
FIG. 5 shows, schematically and in block form, an embodiment of a circuit for detecting the appearance of a stop condition for the generation of a field by an NFC device charging another NFC device to be charged.

FIG. 5 shows, schematically and in block form, an embodiment of a circuit for detecting the appearance of a stop condition for the generation of a field by an NFC device charging another NFC device to be charged.

The circuit of FIG. 5 includes two detection channels 51 and 55, respectively dedicated to the magnitude (MAGN) and the phase (PH) of the signal (of the voltage V) across the terminals of the oscillating circuit or of the antenna of the charging device 1.

Each channel 51, respectively 55, successively includes:
an element 512 (MAGN MEAS), respectively 552 (PH MEAS), for extracting or measuring a piece of analog information representative of the magnitude, respectively of the phase, of the signal across the terminals of the oscillating circuit;
an element 514, respectively 554, for analog-digital conversion (ADC) of the measurements done by the elements 512 and 552;
an element 516, respectively 556, for calculating the average value (AV) of the output signal of the element 514, respectively 554, and supplying a magnitude mean value MMV, respectively phase mean value PMV;
elements 518 (+MΔ) and 520 (−MΔ), respectively 558 (+PΔ) and 560 (−PΔ), for calculating high MHTH, respectively PHTH, and low MLTH, respectively PLTH, magnitude and phase thresholds, thus defining a magnitude MSW, respectively phase PSW, sliding window;
elements 522 (MHTH) and 524 (MLTH), respectively 562 (PHTH) and 564 (PLTH), for storing current values of the calculated thresholds;
comparators 526 and 528, respectively 566 and 568, of the current values coming from the element 514, respectively 554, to the low and high thresholds stored in the elements 522 and 524, respectively 562 and 564; and
a gate 530, respectively 570, for combining (for example an OR-type combination) results supplied by the comparators 526 and 528, respectively 566 and 568.

The description below is functional, and an electronic circuit configured to implement these functions in a hardware and/or software manner (for example by a "computer program product", considered here to be instructions of a program of a microcontroller or microprocessor) can be used.

The digital signals supplied by the respective gates 530 and 570 represent, depending on their state, the result of the detection of the presence of an additional element in the field, or the disappearance of an element from the field, radiated by the device 1.

The circuits 516 and 556 for calculating the current average value of the magnitude and the phase are preferably configurable in terms of depth by a digital setpoint signal MD, respectively PD, that is to say, in number of samples preceding the current value taken into account in the average. This amounts to determining the cutoff frequency of a low-pass filter taking the average. As one specific exemplary embodiment, an average is provided out of 5 to 50 values, preferably in the order of 10 to 20 values.

The frequency of the measurements done of the magnitude and the phase depends on the application and can vary. According to one particular embodiment, an evaluation is provided of the magnitude and the phase several times per second, for example between 1 and 10 times per second, preferably 3 to 4 times per second.

The elements 518 and 520, respectively 558 and 560, add and subtract, from the current value MMV, respectively PMV, a deviation MΔ, respectively PΔ, in order to define the magnitude of the detection window. The window is preferably (but not necessarily, centered on the current mean value.

The respective outputs of the gates 530 and 570 are, for example, sent to a finite-state machine 58 (SM) that supplies the result DET of the detection. This result is interpreted by the circuits 12 of the charging device 1. For example, if this result is in a first state, this means that the charging can continue. Otherwise, this means that the device 1 must interrupt the charging and return to polling mode or standby.

Preferably, the finite-state machine 58, or a processor of the device 1, also receives information on the presence or absence of a variation of the mean values MMV and PMV. For example, the finite-state machine 58 receives the mean values MMV and PMV and determines whether they vary. In case of absence of variation for a duration exceeding a threshold (for example of several seconds), it is considered that charging is completed, the device 2, even if it is still present, no longer withdrawing energy (see the right part of FIG. 4). The finite-state machine 58 then switches the signal DET.

Using the example of three conditions to be detected:
if a foreign object approaches the device 1 and contributes a disruption sufficient to be detected, the departure of at least one of the comparators 526, 528, 566 and 568 switches and the recharging is stopped;
if the device 2 being recharged leaves the field, the departure of at least one of the comparators 526, 528, 566 and 568 switches and the recharging is stopped; and
if the recharging is completed, the moving averages no longer evolve and the recharging is stopped.

The processing channels 51 and 55 illustrated in FIG. 5 make it possible to adapt the magnitude and phase detection windows from a moving average of the corresponding signal. In a way, magnitude and phase sliding windows are determined in order to perform the presence or absence detection.

Figure 6:
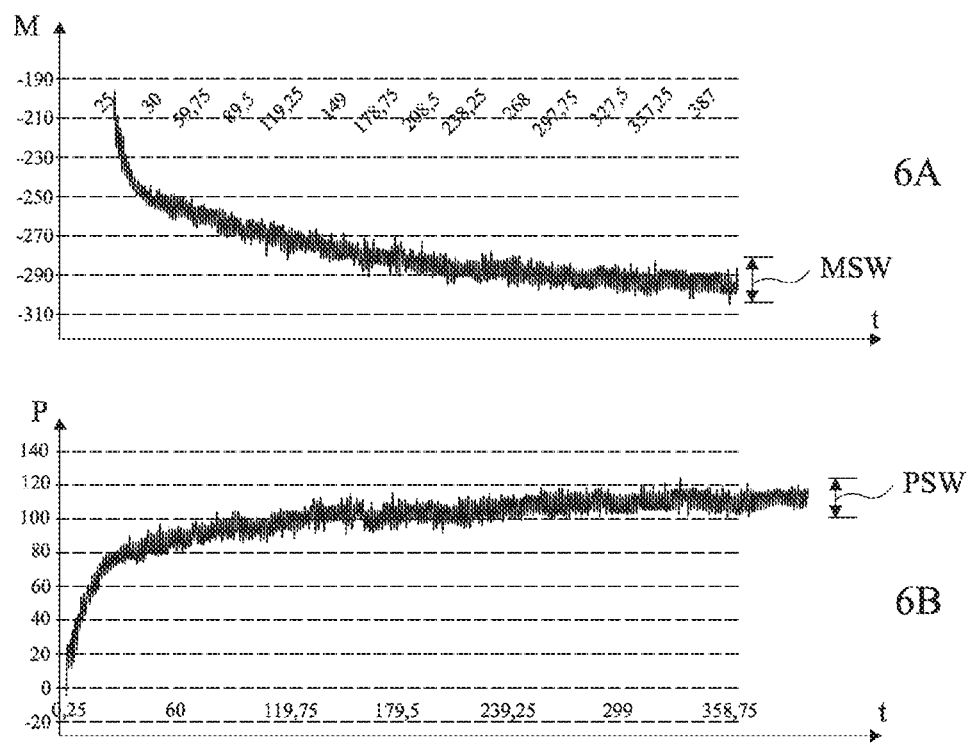
FIG. 6 (view 6A and view 6B) illustrates, by timing diagrams, the operation of the circuit described in connection with FIG. 5.

FIG. 6 illustrates, by timing diagrams, the operation of the circuit described in connection with FIG. 5.

This figure shows examples of timing diagrams of the evolution of the magnitude (view 6A) and the phase (view 6B), measured by a charging device, during the recharging of a device to be charged.

Normal operation is assumed, that is to say, during the recharging phase, no phenomenon (foreign object or departure from field) disrupts the charging, which can therefore be done correctly.

The magnitude M of the voltage across the terminals of the oscillating circuit then decreases with an appearance opposite the growth appearance of the voltage VBAT (FIG. 4) of the charged device. Furthermore, in this example, the phase P of the signal across the terminals of the oscillating circuit increases with an appearance opposite the decreasing appearance of the current Isink withdrawn by the charged device.

As illustrated by views 6A and 6B of FIG. 6, by taking the mean value of the magnitude M and the phase, and defining a window MSW, respectively PSW, as a function (width or magnitude function) of the evolution of this mean value during normal operation, the oscillations of the instantaneous measured magnitude and phase values (the sampled values) vary weakly enough for it to be possible to consider that neither of the first or second conditions is satisfied. Conversely, once the battery is recharged and the device 2 no longer draws enough energy from the field radiated by the device 1, even if the device 2 does not indicate the end of charging by a communication with the device 1, the latter can determine that the magnitude M and the phase P no longer vary enough (do not leave threshold windows) and then consider that the recharging is completed.

One advantage of the described embodiments is that they make it possible to adjust the detection thresholds so as to monitor the slow variations (low frequency) while allowing a detection of abrupt variations representative of the appearance of one of the first conditions that one wishes to detect. Another advantage is that this adjustment of the detection thresholds further makes it possible to detect an end of charging easily, even if the charged device does not send an end of charging message.

It will be noted that the described system for adapting detection thresholds by moving average, for detecting a foreign object or other conditions affecting the electromagnetic field emitted by a device during the recharging of another device, can also be used to adapt the output thresholds of the standby mode.

Indeed, in order to leave its standby mode, when the device in reading mode emits polling bursts, a variation of the magnitude of the field or of its phase can also be disrupted by different environmental factors (metal objects nearby, temperature, etc.). This can lead either to false detections, or to absences of detection.

To try to address this problem, the current solutions consist of adapting the thresholds (calibration) before the device switches to low power mode. Such a calibration of the thresholds consists of emitting a carrier burst and measuring the signal across the terminals of the oscillating circuit to determine an "empty" level. The detection threshold is then adapted relative to this empty situation.

However, these solutions prove unsatisfactory. On the one hand, disruptive elements can interfere with the emitted field and cause false detections or conceal devices present in the field. On the other hand, the calibration is done hot, that is to say, at a moment where the electronic circuits of the device leave an active mode and in which they have consumed and are therefore at a relatively high temperature with respect to the ambient temperature representing their resting temperature. This determination of the hot thresholds is detrimental to the reliability of the detection system.

One might think to wait for the circuits to cool down to perform the calibration. However, this causes a lengthy period (several seconds, or even several minutes) before being able to perform the calibration, and during this entire time, the detection of the low power mode does not work. Additionally, this would not resolve the presence of other environmental disruptions.

It is therefore possible to provide for adjusting the detection thresholds for the exit from standby mode using circuits described in relation with FIG. 5. Preferably, these circuits are shared, that is to say, the same elements are used to exit standby mode or for the detection, during a recharging phase of another device, of a foreign object or an exit from the field by the device being recharged.

Figure 7:
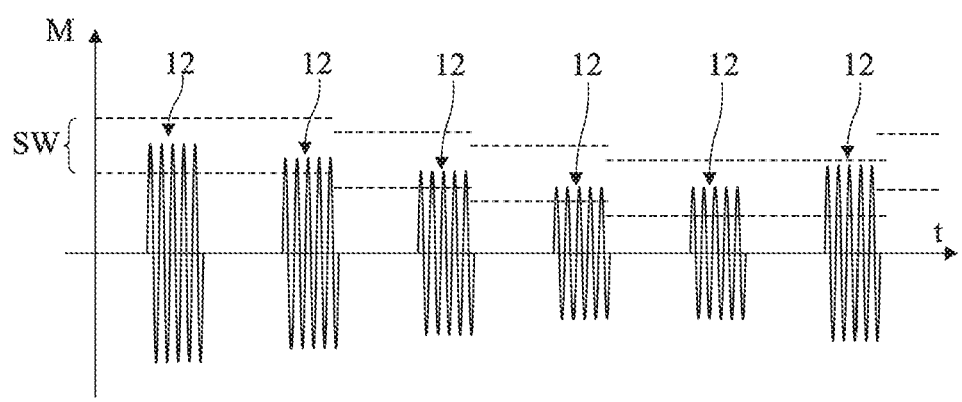
FIG. 7 illustrates, by a timing diagram to be compared with the timing diagram of FIG. 2, the use of the circuit of FIG. 5 during standby phases of an NFC device.

FIG. 7 illustrates, by a timing diagram to be compared with the timing diagram of FIG. 2, the use of the circuit of FIG. 5 during standby phases of the device 1.

This figure applies both to the magnitude and the phase of the signal across the terminals of the oscillating circuit of the device 1. Indeed, whether for the magnitude or the phase, the evaluated property is translated into voltage value by the block 512 or 552, then into number by the block 514 or 554, and can therefore be represented by a magnitude (magnitude M, FIG. 7). Likewise, in both cases, the implementation of the described embodiments is reflected by an evolution of a sliding window SW from one burst 12 to another as a function of the evolution of the environment of the device 1.

In the beginning, the calibration (hot) provides identical thresholds to the solution of FIG. 2 (the scale is not respected relative to FIG. 2). However, these thresholds gradually decrease as the electronic circuits of the device cool down. As a result, a card that would not be detected with the usual solution is detected here, and conversely, a false detection is avoided that would only be due to the cooling of the device. Furthermore, the thresholds can, if applicable, increase again (more generally, vary) in the presence of other disruptive elements in the environment of the device (for example, a hand, a metal object, etc.) as illustrated by the right part of FIG. 7.

Figure 8:
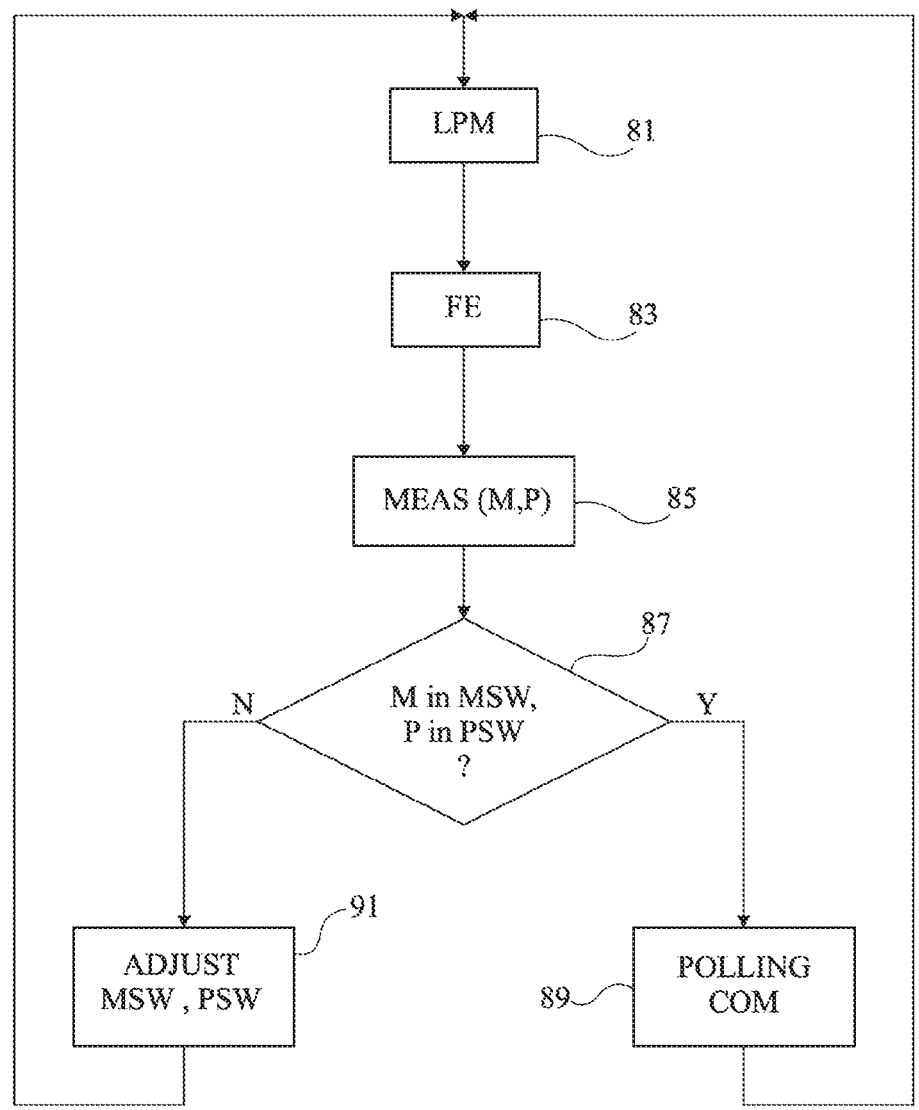
FIG. 8 shows, in block diagram form, one mode of implementation of a method for adapting output thresholds of a standby mode.

FIG. 8 shows, in block diagram form, one mode of implementation of a method for adapting output thresholds of a standby mode, which amounts to a method for detecting the presence of an NFC device in the field of an emitting device.

According to this embodiment, it is also provided to adjust the detection thresholds periodically. Preferably, this adjustment is done upon each detection burst. In other words, the calibration process typically carried out, for a passage to standby mode, before entering low power mode, is executed upon each detection burst. Indeed, a detection burst corresponds to the emission of a field during a short duration (in the order of around ten or a hundred microseconds). It is then possible to measure the magnitude and the phase in order to adapt the detection thresholds.

The case is considered of an NFC device (for example DEV1, FIG. 1) which, when it is in low power mode (block 81, LPM), periodically (for example, every 256 ms) emits a field during a relatively short duration) in the order of about every ten to several hundred microseconds) relative to the duration between two field bursts 12, in order to detect the presence of another NFC device within range. According to how the bursts are implemented (microcontroller or finite-state machine), the device leaves standby mode during the emission of a burst to return thereto immediately afterwards or stays in standby mode while a device is not detected. In FIG. 8, the case is presumed where the device stays in standby mode.

For each burst 12, the device emits a field (block 83, FE) at the resonance frequency of the system and measures (block 85, MEAS (M, P)) the magnitude M and the phase P of the signal across the terminals of its oscillating circuit (not shown).

Assuming that a second device (DEV2, FIG. 1) is within range, its mere presence (the coupling between the two antennas) creates a magnitude and phase variation on the device side 1. If this variation is sufficient for one of the magnitude detection thresholds MHTH and MLTH, or one of the phase detection thresholds PHTH and PLTH, to be reached, that is to say, the measured magnitude or phase leaves the window SW (FIG. 7) (MSW for the magnitude, PSW for the phase, exit Y from the block 87, M in MSW, P in PSW?), the detection is validated.

The device 1 then leaves low power mode to initiate a communication (block 89, POLLING COM). This switch can be done directly after the detection burst or after a time interval (low faced with the time interval between two bursts 12).

Otherwise (exit N from the block 87), that is to say if the signal remains in the windows MSW and PSW corresponding to the empty operation, the detection burst stops.

However, according to the described embodiment, the magnitude and phase thresholds are updated (block 91, ADJUST MSW, PSW) as a function of values M and P measured during the current detection burst in order to serve as thresholds for the following burst. This operation is similar to the operation described in connection with FIG. 5. Thus, each detection burst serves not only for detection, but also for the adaptation of the detection thresholds for the following burst(s). The adjusted threshold(s) are stored and the device continues its monitoring (return to block 81).

In practice, in the case of a finite-state machine, the latter places itself in standby or inactive mode during a time delay corresponding to the interval between two bursts.

In case of communication (block 89, POLLING COM), one returns to a low power mode (block 81) once the communication is completed.

In a variant, the adaptation of the thresholds is not done upon each detection burst, but with a certain burst periodicity, for example every two bursts or every four bursts. However, the calibration is preferably done upon each burst, since this yields a more reliable detection.

According to one embodiment, the stored thresholds are simply replaced by the new thresholds measured upon each burst and the new thresholds are used for the following burst.

According to another preferred embodiment, compatible with the embodiment of FIG. 5, a moving average is taken out of a number of measurements for example of between 5 and 50, preferably in the order of 10 to 20. Initially (during the passage to low power mode), the number of thresholds taken into account in the average is lower (for example, it begins at one and increases over the course of the measurements up to 10).

One advantage of the described embodiments is that it is henceforth possible to use an automatic detection effectively for the exit from low power mode by presence detection of a device in card mode in the field.

Another advantage is that the described solutions create negligible additional consumption, which is limited to storage of the threshold of each burst with an average calculation. In particular, the measurement itself does not create additional consumption inasmuch as one takes advantage of the measurement done for the detection.

Another advantage of the described embodiments is that they do not modify the communication protocols between the devices. Thus, the described solutions are compatible with the usual systems.

Another advantage of the described embodiments is that it is possible to use the same principle of sliding threshold windows, or even the same circuits, to detect an exit from standby mode and an exit from recharging mode.

Another advantage is that the implementation of the described embodiments is compatible with a software implementation. Thus, according to one embodiment, the implementation of the described embodiments uses the existing hardware functions of the existing devices and only requires a software update in order to incorporate the steps of the method for adjusting the detection thresholds. However, according to one preferred embodiment in particular avoiding temporarily leaving the low power mode upon each burst, an implementation is provided by a hardware solution, for example by a finite-state machine (using hardwired logic). This generally allows a faster execution with lower power.

Various embodiments and modes of implementation have been described. Various modifications will appear to those skilled in the art. In particular, the duration between two measuring samples of the magnitude and the phase can vary from one application to another. Furthermore, the determination of the magnitude or depth of the detection windows (the interval between the two thresholds for defining the magnitude window and the interval between the two thresholds for defining the phase window) depends on the application and can vary.

Finally, the practical implementation of the embodiments and variants described herein is within the capabilities of those skilled in the aft based on the functional description provided hereinabove.

What is claimed is:

1. A detection method comprising:
generating, by a first near field communication (NFC) device, an electromagnetic field for recharging a battery of a second NFC device;
adjusting, by the first NFC device, in real time during the recharging, upper and lower thresholds of one or more variables representing the electromagnetic field, for detection of a variation of the electromagnetic field; and
detecting, by the first NFC device using the adjusted upper and lower thresholds, a disruptive condition disrupting the recharging of the battery.

2. The method according to claim 1, wherein two magnitude thresholds delimit a magnitude window of a signal magnitude across terminals of an oscillating circuit of the first NFC device.

3. The method according to claim 2, wherein two phase thresholds delimit a phase window of a signal phase across the terminals of the oscillating circuit of the first NFC device.

4. The method according to claim 3, further comprising adjusting, by the first NFC device, the upper and lower thresholds several times per second during the recharging of the battery of the second NFC device.

5. The method according to claim 3, wherein each window is a sliding window as a function of an average of several measured values of the respective signal magnitude or signal phase.

6. The method according to claim 5, wherein each average averages between 5 and 50 of the respective measured values.

7. The method according to claim 3, further comprising stopping, by the first NFC device, the recharging in response to a currently-measured magnitude being outside the magnitude window or a currently-measured phase being outside the phase window.

8. The method according to claim 1, wherein the disruptive condition is:
an appearance of a foreign object in the electromagnetic field generated by the first NFC device;
a departure of the second NFC device from the electromagnetic field generated by the first NFC device; or
a complete charge situation of the battery of the second NFC device.

9. The method according to claim 8, wherein the complete charge situation is indicated by an absence of variation of the upper and lower thresholds during a selected duration.

10. The method according to claim 1, further comprising adjusting, by the first NFC device and outside recharging periods, the upper and lower thresholds during transmission bursts between standby phases of the first NFC device.

11. The method according to claim 10, further comprising:
detecting, by the first NFC device, the second NFC device being within detection range; and
switching, by the first NFC device, to an operating mode for transmitting a polling sequence in response to the detecting the second NFC device.

12. A first near field communication (NFC) device, comprising:
an NFC antenna configured to generate an electromagnetic field for recharging a battery of a second NFC device;
a threshold adjustment circuit configured to, in real time during the recharging, adjust upper and lower thresholds of one or more variables representing the electromagnetic field, for detection of a variation of the electromagnetic field; and
a state machine configured to detect, using the adjusted upper and lower thresholds, a disruptive condition disrupting the recharging of the battery, and to stop the recharging in response to the disruptive condition.

13. The device according to claim 12, further comprising an oscillating circuit having terminals, wherein two magnitude thresholds delimit a magnitude window of a signal magnitude across the terminals.

14. The device according to claim 13, wherein two phase thresholds delimit a phase window of a signal phase across the terminals.

15. The device according to claim 14, further comprising:
a magnitude averaging circuit providing a magnitude average of several measured values of the signal magnitude, wherein the magnitude window is a sliding window as a function of the magnitude average; and
a phase averaging circuit providing a phase average of several measured values of the signal phase, wherein the phase window is a sliding window as a function of the phase average.

16. The device according to claim 15, wherein each average averages between 5 and 50 of the respective measured values.

17. The device according to claim 14, wherein the state machine is configured to stop the recharging in response to a currently-measured magnitude being outside the magnitude window or a currently-measured phase being outside the phase window.

18. The device according to claim 12, wherein the disruptive condition is:
an appearance of a foreign object in the electromagnetic field generated by the first NFC device;
a departure of the second NFC device from the electromagnetic field generated by the first NFC device; or
a complete charge situation of the battery of the second NFC device.

19. A computer program product including instructions for:
causing a first near field communication (NFC) device to generate an electromagnetic field for recharging a battery of a second NFC device;
adjusting in real time during the recharging, upper and lower thresholds of one or more variables representing the electromagnetic field, for detection of a variation of the electromagnetic field; and
detecting, using the adjusted upper and lower thresholds, a disruptive condition disrupting the recharging of the battery.

20. The computer program product according to claim 19, wherein two magnitude thresholds delimit a magnitude window of a signal magnitude across terminals of an oscillating circuit of the first NFC device.

21. The computer program product according to claim 20, wherein two phase thresholds delimit a phase window of a signal phase across the terminals of the oscillating circuit of the first NFC device.

22. The computer program product according to claim 21, including further instructions for adjusting the upper and lower thresholds several times per second during the recharging of the battery of the second NFC device.

23. The computer program product according to claim 21, wherein each window is a sliding window as a function of an average of several measured values of the respective signal magnitude or signal phase.

24. The computer program product according to claim 19, including further instructions for adjusting, outside recharging periods, the upper and lower thresholds during transmission bursts between standby phases of the first NFC device.

25. The computer program product according to claim 19, including further instructions for:
detecting the second NFC device being within detection range; and
switching to an operating mode for transmitting a polling sequence in response to the detecting the second NFC device.

* * * * *